United States Patent
Rolland et al.

(10) Patent No.: US 8,496,167 B2
(45) Date of Patent: Jul. 30, 2013

(54) CASH TRACKING SYSTEM

(75) Inventors: Richard A. Rolland, Carrollton, TX (US); Michael H. Manor, Plano, TX (US); Jeremy R. Brookes, Lexington, KY (US)

(73) Assignee: Sargent & Greenleaf, Inc., Nicholasville, KY (US)

( * ) Notice: Subject to any disclaimer, the term of this patent is extended or adjusted under 35 U.S.C. 154(b) by 884 days.

(21) Appl. No.: 11/937,273

(22) Filed: Nov. 8, 2007

(65) Prior Publication Data
US 2008/0223930 A1   Sep. 18, 2008

Related U.S. Application Data

(60) Provisional application No. 60/864,824, filed on Nov. 8, 2006.

(51) Int. Cl.
*G06Q 40/00* (2012.01)
*G07F 19/00* (2006.01)
*G06K 15/00* (2006.01)

(52) U.S. Cl.
USPC .......................................... 235/379; 235/383

(58) Field of Classification Search
USPC ............... 235/379, 383, 385, 375; 705/35–45
See application file for complete search history.

(56) References Cited

U.S. PATENT DOCUMENTS

| | | | | |
|---|---|---|---|---|
| 5,701,828 A | * | 12/1997 | Benore et al. | 109/56 |
| 5,890,439 A | * | 4/1999 | McGunn | 109/47 |
| 5,975,275 A | * | 11/1999 | Keith et al. | 194/217 |
| 6,885,281 B2 | * | 4/2005 | McGunn et al. | 340/5.5 |
| 7,216,098 B1 | * | 5/2007 | Brooks et al. | 705/30 |
| 7,520,421 B2 | * | 4/2009 | Salafia et al. | 235/379 |
| 2002/0063034 A1 | * | 5/2002 | Dobbins | 194/302 |
| 2004/0210515 A1 | * | 10/2004 | Hughes | 705/39 |
| 2005/0077347 A1 | * | 4/2005 | Uematsu et al. | 235/379 |
| 2007/0226142 A1 | * | 9/2007 | Hanna et al. | 705/41 |
| 2007/0228152 A1 | * | 10/2007 | Washington et al. | 235/379 |

* cited by examiner

*Primary Examiner* — Tuyen K Vo
(74) *Attorney, Agent, or Firm* — Faegre Baker Daniels LLP

(57) ABSTRACT

A system of tracking the location of cash is disclosed.

20 Claims, 5 Drawing Sheets

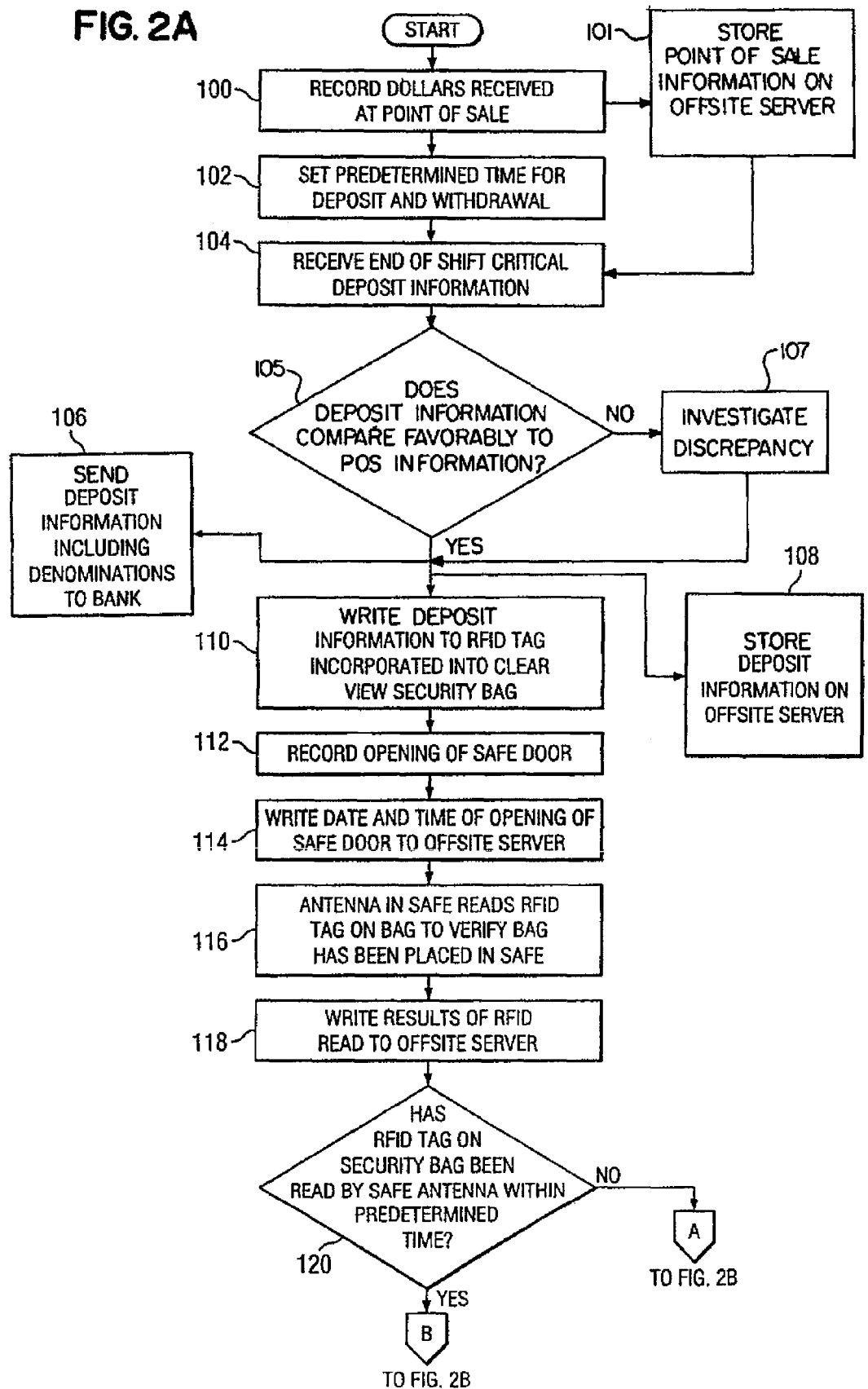

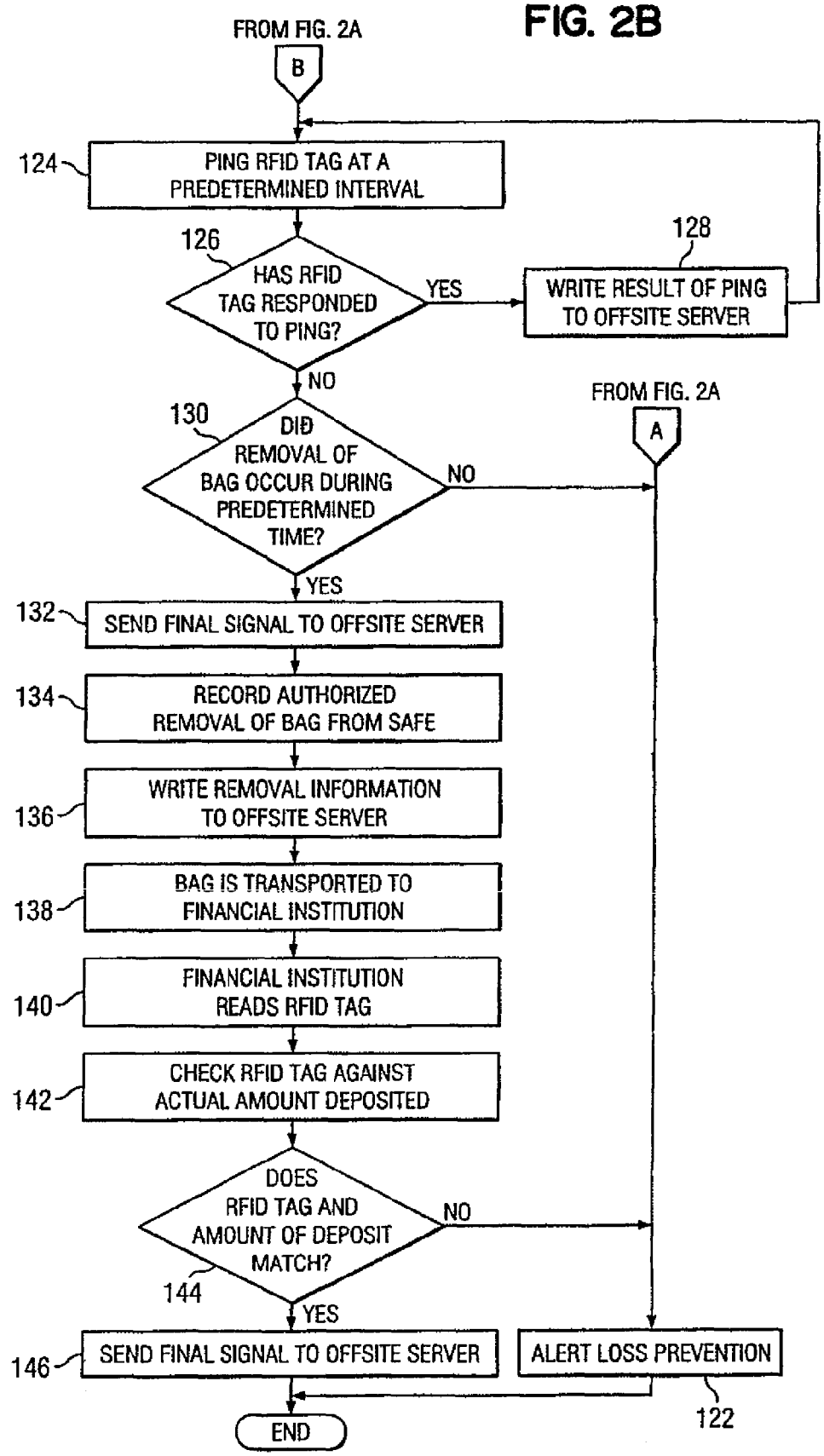

CASH TRACKING SYSTEM

RELATED APPLICATIONS

This application claims priority to U.S. Provisional Patent Application Ser. No. 60/864,824, filed Nov. 8, 2006, to Rolland et al., titled "System and Method for Positive Deposit Verification," the disclosure of which and the disclosure of PCT Patent Application Serial No. UNKNOWN, filed Nov. 8, 2007, to Rolland et al., titled "Cash Tracking System" are expressly incorporated by reference herein.

BACKGROUND AND SUMMARY

The present invention relates to the security of cash. More particularly, the present invention relates to verifying the location of secured cash.

It is generally understood in the profession of crime solving that the shorter the period of time from the event or loss until the beginning of an investigation, the greater the likelihood that the loss will be recovered and/or the person responsible for the loss will be identified. The typical safe and lock equipment used in fast food, retail, and casual dining environments where large quantities of cash are handled, are capable of producing an audit trail. This audit trail may identify who accessed safe 52 and when safe 52 was accessed. In addition, conventional safe and lock equipment may also have the ability to time lock certain authority levels out of safe 52 and time delay the opening of safe 52 in order to deter armed robbery.

When a loss occurs, the issue most critical to an investigation is a quick response. Unfortunately, loss prevention managers may be responsible for multiple locations, and their ability to respond quickly almost solely depends on how fast the bank or treasury department alerts them that a discrepancy exists between what was reported through the point of sale system and what was actually deposited. Loss prevention managers can then work back from this point in an effort to pinpoint where the discrepancy or loss occurred. Because loss prevention managers must wait until they are alerted of a discrepancy, an investigation into the details surrounding the loss may not begin until two to four weeks after the mistake or mysterious disappearance occurred.

In retail operations, it is common for a manager to prepare a deposit at the end of a shift. After recording the amount of the deposit and other information, the deposit may be placed in a deposit bag. The deposit bag may then be secured in a safe until it can be transported to a financial institution by the manager or an armored car service. It is a common problem to experience loss of cash after the deposit is prepared, but before it reaches a financial institution.

According to one aspect of the present invention, a method of verifying a deposit is provided. The method includes the steps of providing a deposit bag with a radio frequency identification ("RFID") tag secured to the deposit bag; reading the RFID tag by a safe antenna to verify that the deposit bag has been deposited into a safe; attempting to communicate with the RFID tag by the safe antenna at a predetermined time; and sending a signal that the deposit bag has been removed from safe, if the RFID tag does not respond to the communication of the safe antenna.

According to another aspect of the present invention, a safe for securing assets is provided. The safe comprises a safe housing defining an interior region, a door permitting access to the interior region of the safe housing, a lock positioned to block access to the interior region though the door, a deposit container including an RFID tag, and at least one antenna in periodic communication with the RFID tag to detect the presence of the RFID tag within the interior region of the safe housing.

According to another aspect of the present invention, a cash tracking system is provided. The system comprises a plurality of safes and a server. Each safe includes an interior region sized to receive a plurality of deposit containers having an RFID tag secured thereto and at least one RF antenna coupled to the safe to detect the presence of the RFID tag within the safe. The server receives information from the plurality of safes indicative of the location of the deposit containers based on the detection of the RFID antennas associated with the safes.

According to another aspect of the present invention, a deposit container, such as a security deposit bag, ATM cassette, or other deposit container, is provided with an RFID or other tag. The tag may include information about the contents of the deposit container or other information.

According to another aspect of the present invention, a safe is provided with a transceiver to read and/or write to an RFID or other tag that is securable to a container, such as a security deposit bag or other container. The transceiver communicates with the tag. This communication may include the tag identification, information about the contents of the container, and/or an identification of a retailer or others associated with the safe.

According to another aspect of the present invention, a safe is provided that is compartmentalized into a plurality of compartments. At least one container with an RFID or other tag, is placed in one or more of the plurality of compartments. The safe further includes at least one antenna positioned to communicate with at least one of the tags. According to one embodiment, the antenna or compartments move relative to each other. According to another embodiment, a plurality of antennas are provided in the safe.

According to another aspect of the present invention, a safe system is provided that receives information regarding the contents stored or to be stored in the safe. The information may or may not include the contents of deposit containers stored or to be stored in a safe, such as the total value of the contents and the number and type of the contents; the identification of the deposit container; an indication of the owner of the contents, such as the owner of a retail establishment; and/or other information.

According to another aspect of the present invention, a system is provided for tracking a container, such as a deposit bag, from a secured location, such as a safe at a retailer, to another location, such as a cash carrier, bank, or other location. The system may or may not include an off-site server that communicates with the secured location and the owner of the contents of the container or with others.

Additional features of the present invention will become apparent to those skilled in the art upon consideration of the following detailed description of the presently perceived best mode of carrying out the invention.

BRIEF DESCRIPTION OF THE DRAWINGS

A detailed description particularly refers to the accompanying figures in which:

FIGS. 2A and 2B illustrate a flow chart of a method for verifying a deposit;

DETAILED DESCRIPTION OF THE DRAWINGS

The teachings of the present disclosure relate to a system and method for positive deposit verification using Radio Frequency Identification ("RFID"). Particular embodiments of the present disclosure allow a user(s) to track deposits between two points, such as an End of Shift ("EOS") and Treasury, thereby reducing the opportunity for internal theft and/or other "mysterious disappearances."

Figure 1:
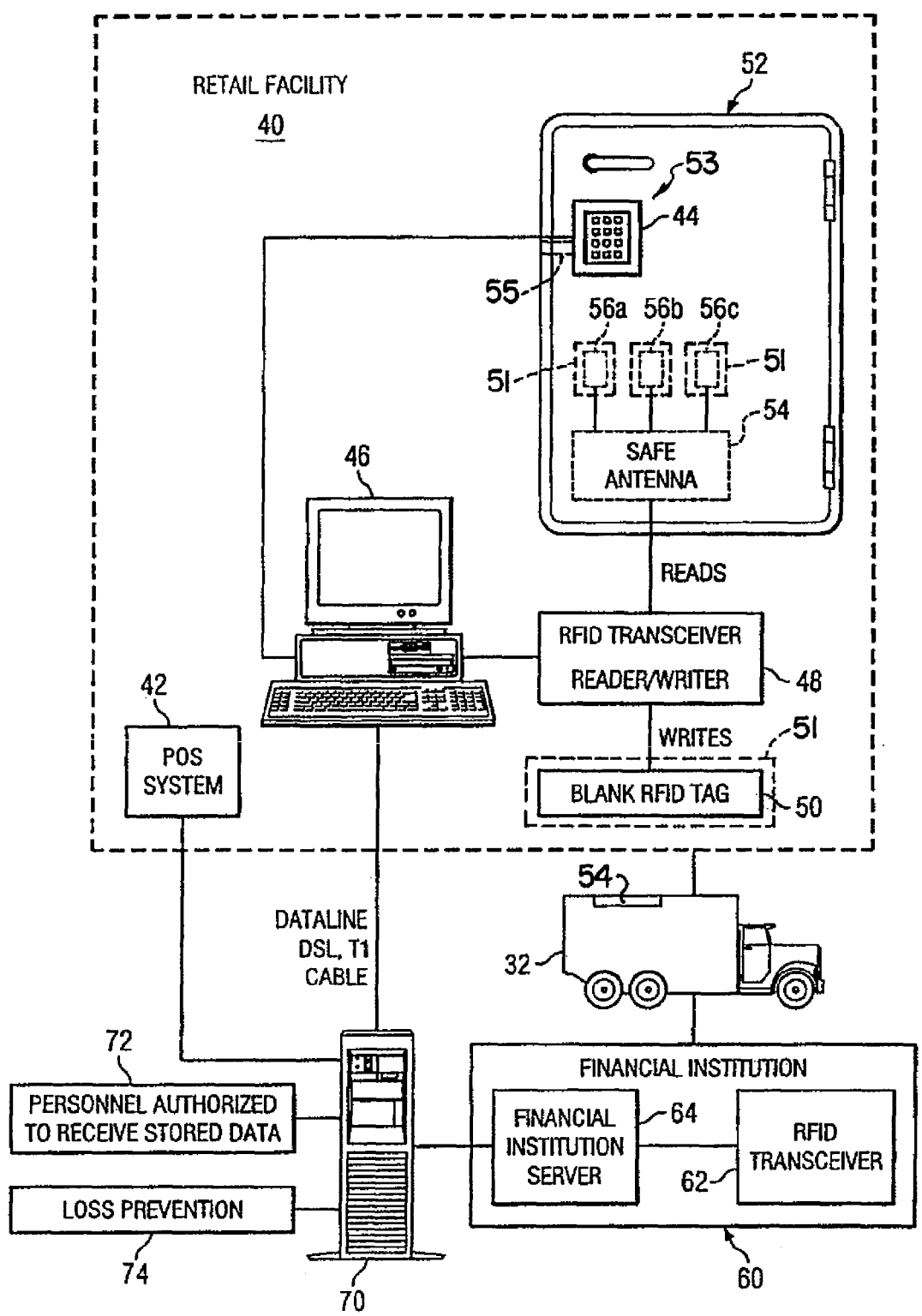
FIG. 1 illustrates one embodiment of a deposit verification system.

FIG. 1 illustrates a deposit verification system 30 including a safe 52 that may be located at a retail facility 40. Safe 52 includes an embedded safe antenna 54 that is operable to communicate with a plurality of RFID tags 56*a-c*. Also located at retail facility 40 is an RFID transceiver 48 that is operable to write to blank RFID tags, for example blank RFID tag 50. Information that is transmitted and/or received from components of the positive deposit verification system 30 may be stored on an offsite server 70, on site at retail facility 40, or both. Offsite server 70 is operable to communicate with a personal computer 46 that is operable to communicate with an electronic lock 53 having a lock keypad 44. Offsite server 70 is also operable to communicate with the loss prevention department typically, offsite associated with the company that operates retail facility 40 and a server 64 located at a financial institution 60.

Figure 8:
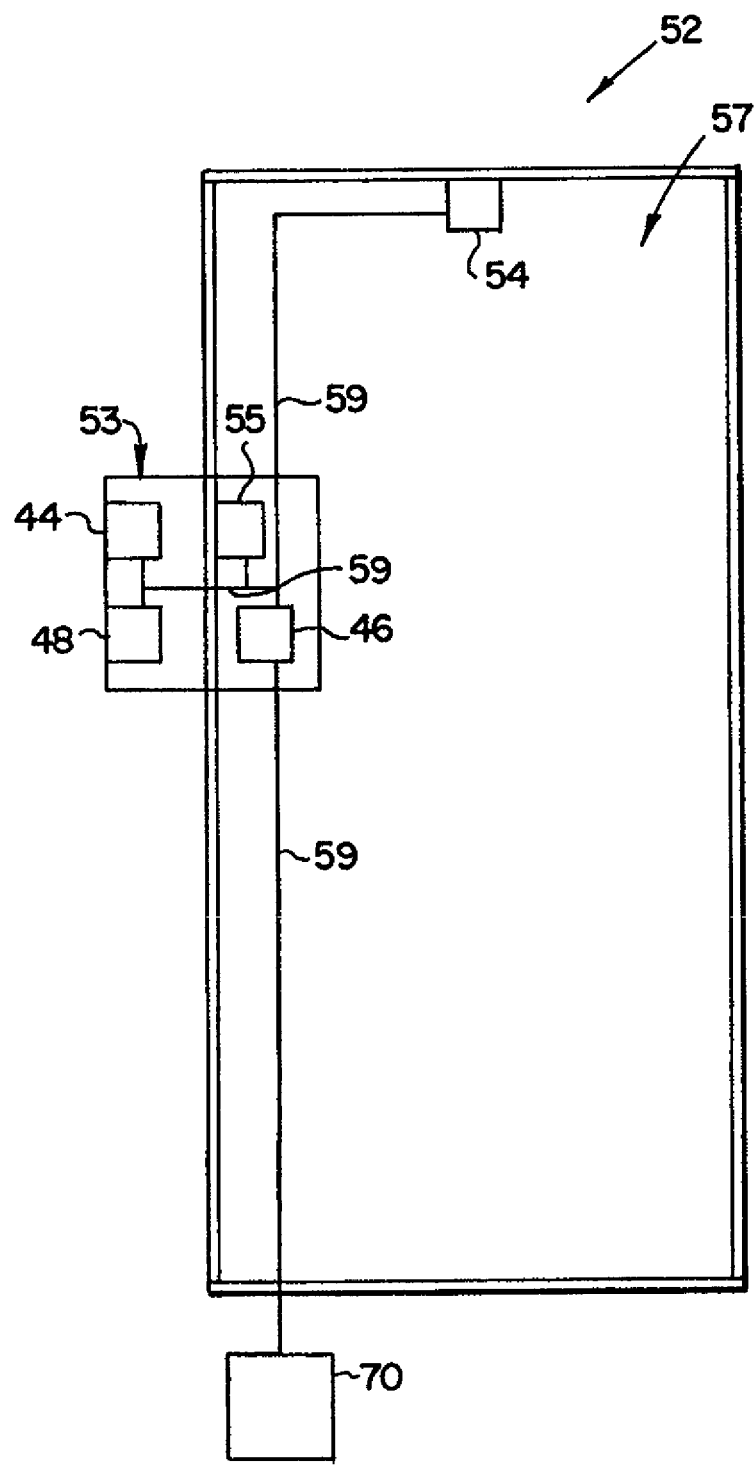
FIG. 8 is a diagrammatic view of an alternative embodiment electronic lock arrangement.

Personal computer 46 may include a laptop computer, notebook computer, personal digital assistant ("PDA"), cell phone, or any other computing device(s) having the ability to receive, transmit, process and/or store information. According to one embodiment, the functionality of personal computer 46 and RFID transceiver 48 is incorporated into electronic lock 53. For example, as shown in FIG. 8, lock 53 includes keypad 44 and RFID transceiver 48 positioned outside of an interior region 57 of safe 52 and a lock mechanism 55 and computer/PC board 46 positioned within interior region 57. Safe antenna(s) 54 may be positioned anywhere within interior region 57 including within electronic lock 53 as a component thereof. Computer/PC board 46 acts as the control center for the electronic components of lock 53 and is in communicate via lines 59 with these components and offsite server 70. The software and firmware for the components of lock 53 may be stored on PC board 46 or within the components themselves.

In accordance with a particular embodiment of the present disclosure, deposit information is written to a blank RFID tag 50 that may be fixed to a clear view security or deposit bag (e.g., transparent or translucent) 51 containing cash received at retail facility 40. Bag 51 and RFID tag 56*a-c* 56*a* are transported to a financial institution 60, where RFID tag 56*a-c* 56*a* is read by an RFID transceiver 62 and the information read from RFID tag 56*a-c* 56*a* is compared to the actual amount of the deposit received. Details of suitable deposit bags are provided in U.S. Pat. Nos. 4,988,547; 4,937,040; 4,838,708; and 4,720,040, the disclosure of which are expressly incorporated by reference herein.

According to a particular embodiment of the present disclosure, an RFID positive deposit verification system 30 may be operational at three different locations. The system may be operational at a retail facility 40, at a financial institution 60, and/or at an offsite server 70. At retail facility 40, the point of sale system 42 records the sales of retail facility 40 over the course of a predetermined period (e.g., a day, or a shift). The point of sale system 42 may include one or more computers and/or cash registers that may be networked together to facilitate communication with each other and/or with a central server.

The point of sale system 42 may be operable to communicate with an offsite server 70. Retail facility 40 also includes an area where the end of shift deposit is handled. The end of shift deposit may include all the cash that was received by retail facility 40 over a predetermined period. At a predetermined time (e.g., end of shift) a deposit of a certain amount and particular denominations of cash is prepared by the manager or other authorized person associated with the company that operates retail facility 40. The deposit may also include credit card slips, checks, travelers checks, money orders, deposit slips, and/or any other paper showing a financial transaction. In order to secure the deposit prepared by the manager until it can be safely transported to a financial institution 60, retail facility 40 may include a safe 52. Safe 52 may have an electronic lock 53 that is operable to communicate with personal computer 46.

In accordance with a particular embodiment of the present disclosure, electronic lock 53 may be an IP Series™ electronic lock available from Sargent and Greenleaf. Electronic lock 53 may be programmed, controlled and/or communicated with remotely through web-enabled software. Additional details of electronic lock 53 and other suitable electronic locks is provided in U.S. Patent Application Publication No. 2004/0189439 to Cansino, filed Mar. 28, 2003, titled "Local and Remote Management of Lock Systems From a Network; and U.S. Pat. Nos. 6,212,923; 6,196,037; 6,094,952; 6,016,677; 5,816,084; and 5,473,933, the entire disclosures of which are expressly incorporated by reference herein.

Electronic lock 53 may be operable to record an audit trail and create an exception report. Through software associated with electronic lock 53, an immediate exception report may be sent by email to a designated person that may take action to investigate the report.

Exception reporting may be one of the attributes of the positive deposit verification system 30. An exception report may issue if any anomaly occurs outside of what is defined as the normal procedure. For instance, if an end of shift report was filed at 10:00 p.m. on a given night, it may be standard procedure for the deposit associated with that end of shift report to be placed in safe 52 within two hours. If RFID tag 56*a-c* associated with this deposit is not read by safe 52 within two hours, an exception report may issue. Similarly, an exception report may issue if the amount of the deposit is below a threshold value or below a predetermined value. An exception report may also issue if one or all of RFID tags 56*a-c* in safe 52 were removed. The amount of money held in safe 52 may also trigger an exception report. For example, if management determined that a certain amount of money was not to be held in safe 52 over a three day weekend, an exception report may issue to notify management that a deposit over that amount is in safe 52.

In addition to defining the parameters that cause an exception report to issue, how and where an exception report is sent may also be predefined. The exception report may be sent via email, text message, or other communication means to the sales manager and/or loss prevention personnel.

Through lock keypad 44 or personal computer 46, the manager of retail facility 40 may enter deposit information into personal computer 46. At retail facility 40, there may be an RFID transceiver 48. RFID transceiver 48 may be configured to read a plurality of RFID tags 56a-c. It may also be configured to write to a blank RFID tag 50. According to a particular embodiment of the present disclosure, RFID transceiver 48 may have a first and second channel wherein the first channel may be configured to write to a blank RFID tag 50 and the second channel may be configured to read RFID tags 56a-c. Electronic lock 53 may operate using A/C power and may be the power source for RFID transceiver 48.

Inside safe 52 may be an X/Y safe antenna 54. Safe antenna 54 may be configured to communicate with a plurality of RFID tags 56a-c and may also be configured to communicate with RFID transceiver 48. Safe antenna 54 may include a series of antennas that are in phase. Splitters may be used to separate the signal of RFID tag 56a-c that is currently being read from the other RFID tags 56a-c in safe 52.

Communication from safe antenna 54 to RFID tags 56a-c occurs through radio waves. RFID transceiver 48 emits a radio signal through safe antenna 54 that activates any one or more of RFID tags 56a-c so the transceiver can read and write data to the any one of the plurality of RFID tags 56a-c. RFID tags 56a-c may be active, or passive (i.e., no internal power supply). Thus, the minute electrical current induced by the incoming radio frequency signal to the passive RFID tag 56a may provide enough power for RFID tag 56a-c 56a to power up and transmit a response.

In a particular embodiment of the present disclosure, the system utilizes high frequency RFID tags 50 and 56a-c. The high frequency radio waves transmitted to and from RFID tags 56a-c is well suited for the RFID positive deposit verification system 30. The system may be designed such that the radio frequency RFID tags 56a-c transmits and/or receives lacks the ability to penetrate dense material like a safe 52 constructed of metal. Furthermore, the steel surrounding safe antenna 54 may act to enhance the ability of safe antenna 54 to read the radio signal(s) transmitted to and from RFID tags 56a-c. The inability of the high frequency radio waves to penetrate a safe 52 constructed of metal may prevent safe antenna 54 from inadvertently reading a RFID tag that is outside safe 52. Accordingly, deposit verification system 30 cannot be made to think it received a deposit by having it read an RFID tag 56a-c that is outside of safe 52.

Safe antenna 54 may be configured to allow it to be retrofitted in the cavity of a safe 52. The retrofit capability of safe antenna 54 may allow existing safes located at retail facilities to be configured with a safe antenna 54 of the RFID positive deposit verification system 30. This would eliminate the need to install a new safe that incorporates a safe antenna 54 at each retail facility location. Safe antenna 54 may be designed such that it is embedded in material that may be folded and opened. The embedded safe antenna 54 and the electronic components that operate safe antenna 54 may be secured in an existing safe cavity. The material in which safe antenna 54 is embedded may be placed into the cavity of safe 52 and opened similar to the opening of a laptop computer. The power may be connected to safe antenna 54 and its electronic components to allow a plug-and-play-type installation in the field.

It is likely that a retail facility 40 may have limited space to accommodate additional electronic equipment that may store information associated with deposit verification system 30. Therefore, deposit information may be stored in an offsite server 70. Offsite server 70 may also allow the deposit information to be stored outside of the Information Technology ("IT") network of retail facility 40. Storing deposit information outside an IT network may be important because corporate IT departments would prefer that certain software applications not cross its firewall, as this is considered a breach of protocol.

Offsite storage of deposit information may also provide increased memory capacity to store information that may be used to positively identify deposits in the system 30. This information may be an audit trail from electronic lock 53, audit information from the RFID positive deposit verification system 30, and/or identification information from any of the plurality of RFID tags 56a-c. By increasing the memory capacity over that of a typical electronic lock 53 (400 to 4000 events) the ability to investigate a loss or mysterious disappearance may be enhanced. For example, the increased memory capacity may allow an investigation into the loss to occur months or even years after memory associated with a conventional electronic lock would have been written over.

In addition, offsite server 70 may allow for deposit verification information from a plurality of retail facilities 40 (e.g., multiple restaurants of a single owner) to be stored on one offsite server 70. Offsite server 70 may be operable to communicate with the security or loss prevention department 74 associated with the company that operates retail facility 40. Offsite server 70 is also accessible by personnel authorized to receive data 72 stored in offsite server 70.

Deposit verification system 30 may also be configured to allow a server 64 associated with financial institution 60 to communicate with offsite server 70. Also at the financial institution 60, there may be an RFID transceiver 62 that is operable to read one or a plurality of RFID transponders 56a-c that are transported to financial institution 60 by an armored car service 32 or other suitable secure transportation means. This, and other information may be communicated between financial institution 60, offsite server 70, and/or retail facility(ies) 40.

FIGS. 2A and 2B illustrate a method for positively verifying a deposit using RFID. The method begins at step 100, where price and dollar amount received information is received at the point of sale. The point of sale may be a cash register or computer at the counter of a restaurant. The operator of the cash register may enter the item ordered and the register may record a corresponding price for that item. This information is used to track the amount received by a retail facility 40 for accounting and verification purposes. The cash received throughout the predetermined period (e.g., a shift) less the amount of cash that is kept in the cash register drawer should equal the amount accounted for at the end of shift. At the time of the transaction with a customer, the POS information is sent from POS system 42 to offsite server 70 to be stored and/or processed. This POS information may include the time of the sale, the sales associate taking the sale, the identification of the register of the sale, the number and types of items sold, payment type, and any other information related to the transaction.

At step 101, this information is stored and/or processed by offsite server 70. During processing, offsite server 70 may tally the total monetary sales, total the number of each items sold, analyze the timing and/or frequency of sales of particular items, calculate the total amount of cash each register should being holding, calculate the total cash in all registers at a particular location, and perform other useful calculations or analysis based on the POS information. To determine the cash held by each register, offsite server 70 may add the total cash purchases to the initial till of each register. The POS information may also be printed out at the cash register or other location at retailer facility and placed in security bag 51.

At step 102, predetermined times for deposit into safe 52 and withdrawal from safe 52 may be set. The predetermined times facilitate security such that the contents of safe 52 are only authorized to be accessed during either the predetermined time for deposit or the predetermined time for withdrawal. The predetermined times may be communicated to lock keypad 44 by personal computer 46. The contents of safe 52 may only be accessible during the predetermined times.

At step 104, deposit information is received by lock 53. After a manager of retail facility 40 ends his shift, he may prepare the end of shift deposit. Using lock keypad 44 or personal computer 46, the manager may enter his identification code. This may prompt lock keypad 44 or personal computer 46 to allow the manager to enter detailed information about the deposit. This information may include, but is not limited to, the manager's name, the date, the particular shift, the amount of the deposit taken from the end of shift report, and the currency denomination count. The currency denomination count may include the number of bills of each denomination. Once this deposit information is entered into lock keypad 44 or personal computer 46, the information may be available to be written to a blank RFID tag 50. In addition to or as an alternative to keypad 44, other input devices may be used to receive information or validate access rights including biometrics, smart cards, proximity cards, finger prints or other input devices.

In addition to receiving deposit information from the manager or other personnel, lock 53 may receive information from server 70 based on POS information received from POS system 42. This POS information may include the anticipated net amount of cash for each register and/or a total for the cash registers.

At step 105, a comparison is made between the amount of cash to be deposited and the anticipated net amount of cash for each register and/or the total for the cash registers received from offsite server 70. The comparison may be made by the manager, by lock 53, by offsite server 70 (assuming the deposit information is provided to offsite server 70), or by any other method.

Preferably, the actual amount of cash to be deposited exactly matches the anticipated amount received from offsite server 70. The comparison may allow for a margin of error by a predetermined amount, a predetermined percentage of the deposit, or some other calculation. If the comparison is not favorable (i.e. the deposit does not match the POS information or is not within the predetermined margin of error), an investigation into the discrepancy starts at step 107.

At step 107, the manager may investigate the discrepancy between the actual cash on hand and the POS information. This investigation may include comparing the individual cash drawers against the anticipated cash on hand for each drawer as provided by offsite server 70 to narrow down the source of the discrepancy. At step 107, an exception report may be generated and sent to the prevention department 74 of the retailer with or without notifying the manager of the discrepancy. Whether or not the source of the discrepancy is discovered, the deposit information is recorded.

Close monitoring of an amount of cash a financial institution has on hand at any one time, may be very important. In addition, a financial institution may desire to closely monitor the amount of particular cash denominations (e.g., $1 bills, $5 bills, $10 bills, $20 bills, etc.) it has available. Accordingly, in a particular embodiment of the present disclosure, at step 106, the denomination count or other deposit information, and in particular, the currency denomination count, may be transmitted to a financial institution. This may allow financial institution 60 to better predict the amount and particular denominations of currency it may receive from the deposit from retail facility 40.

The deposit information may be written to a blank RFID tag 50 incorporated into a clear view security bag 51 at step 110. Writing the deposit information to RFID tag 56*a-c* incorporated into a clear view security bag 51 allows the deposit information to travel with the actual currency to financial institution 60. The deposit information also serves to identify the particular deposit as an inventory item when it is grouped with other security bags 51. A device capable of reading an RFID tag may be able to identify the particular deposit by its associated deposit information.

After the deposit is fully prepared to be placed into safe 52, the opening of safe 52 door is recorded at step 112 after the manager enters the appropriate code into keypad 44. This deposit information that is recorded may include the audit information from electronic lock 53. This may be the date and time safe 52 door was opened, and the duration it remained open. At step 114, this information associated with the opening of safe 52 door may be written to an offsite server 70. The transmission to an offsite server 70 may be accomplished by the Internet Protocol associated with electronic lock 53 using a data line which may be a DSL, T1, or cable data line. This allows information to be freely transmitted or received by components of a standard telecommunications network.

A verification occurs at step 116 when a clear view security bag 51 including an RFID tag is placed into the secure cavity of a safe. At step 116, an antenna in safe 52 reads RFID tag 56*a-c* on or in security bag 51 to verify that security bag 51 has been placed in safe 52. If for some reason, a positive read of RFID tag 56*a-c* does not occur, the manager is alerted immediately and may notify appropriate authority. By recording the time and date a particular deposit was placed into safe 52, it may be possible to compare this information to the end of shift report. By making a manager accountable to place the deposit into safe 52 within a certain period of time after the end of shift report is filed, unauthorized "borrowing" of deposits by a manager may be prevented.

At step 118, the results of the verification that occurred at step 116 are written to an offsite server 70. As part of the verification step, financial institution 60 may credit the cash deposited into each safe 52 to the bank account of the respective retailer (or other designated party) and increase the financial institution's ability to make loans. By crediting the retailer's bank account with the cash deposited to safe(s) 52, the financial institutions' overall cash reserve also increases with each deposit into each safe 52 located at retail facility(ies) 40. By having increased cash reverses to satisfy its reserve requirement, the financial institution may increase the amount of its overall deposits that it can loan out. Thus, rather than waiting until the cash deposits are received and recorded at financial institution 60 to increase its ability to loan out deposits, the financial institution may increase its loan capacity at the instant a deposit is made into each retailer's safe 52. Additionally, the financial institute's overall deposits increase the instant the deposit is made to safe(s) 52.

As an example, a financial institution 60 has a reserve requirement of 10% and $10,000 in deposits. To satisfy the reserve requirement, financial institution 60 must have $1,000 in reserve (safe/vault cash or on deposit at the Federal Reserve) to loan out the remaining $9,000 in deposits. Anything less than the $1,000 in reverse will limit the financial institution's ability to loan out all or a portion of the $9,000. Assuming financial institution 60 has no reserve for the $10,000 deposit, it may not loan out any of the $9,000. However, if $1,000 in cash is deposited into safe 52 of the retailer and credited to the retailer's account and to the financial institution's reserve, the $9,000 may then be loaned out. Thus, the cash in safes 52 and in transit to financial institution 60 may be used to increase the financial institution's ability to make loans. Additionally, the cash in safe 52 may also be used to increase the financial institutions' overall deposits. The time at which the cash qualifies as reserves cash may occur at other times, such as when the retailer receives the cash from the customer at the register, when the cash carrier picks up the cash from safe 52, or at other times in the handling of the cash, such as receipt, storage, transit, and other times.

At step 120, it is determined whether RFID tag 56*a-c* on the clear view security bag 51 has been read by safe antenna 54 within a predetermined time. If RFID tag 56*a-c* on security bag 51 has not been read by safe antenna 54 within a predetermined time, then the system alerts the security or loss prevention department of a company that operates a retail facility 40 at step 122. This may allow a higher probability of recovering a loss because appropriate action and investigation may be undertaken immediately.

According to a particular embodiment of the present disclosure, individuals responsible for investigating losses of cash deposits that occur after the end of a shift may be notified of the loss, or the exception to the expected deposit procedure (i.e., exception report), almost immediately. Thus, action may be taken while there is a greater chance to recover the lost funds and positively identify the individual responsible for the loss.

While security bag 51 is presumably secure in the cavity of safe 52 at step 124, RFID tag 56*a-c* on the clear view security bag 51 is pinged at a predetermined interval. The ping occurs when safe antenna 54 attempts to communicate with RFID tag 56*a-c*. If RFID tag 56*a-c* responds to the ping by safe antenna 54, the system has verified that security bag 51 (with RFID tag 56*a-c*) containing the cash deposit remains secure in safe 52. The system may be capable of verifying that a plurality of security bags 51 with corresponding RFID tags remain in safe 52 by pinging and receiving a response from each RFID tag.

At step 126, it is determined whether RFID tag 56*a-c* associated with a clear view security bag 51 has responded to the ping by safe antenna 54. If RFID tag 56*a-c* has responded to the ping by responding with its ID or otherwise, then at step 128, the result of the ping is written to an offsite server 70. The result of the ping may be the time and date the ping occurred along with specific identification information associated with the cash deposit contained in security bag 51 associated with RFID tag 56*a-c* that responded to the ping. After the ping information is written to offsite server 70, RFID tag 56*a-c* continues to be pinged at a predetermined interval.

If RFID tag 56*a-c* does not respond to the ping, then at step 130, it is determined whether the removal of the clear view security bag 51 containing RFID tag 56*a-c* that failed to respond to the ping occurred during a predetermined time. If the removal did not occur during a predetermined time, then the security or loss prevention department associated with the company that operates retail facility 40 is alerted at step 122 that the cash deposit was removed at an unauthorized time. An individual accessing the information at offsite server 70 related to the removal of the deposit, may be able to determine an interval in which the removal of a bag 51 containing an RFID tag 56*a-c* occurred. By viewing the information stored in offsite server 70 related to the last successful ping by safe antenna 54, the individual may be able to determine a period of time in which the deposit was removed from safe 52 without authorization. Moreover, an individual may be able to access information identifying the specific amount of the deposit that was removed from safe 52.

If the removal of security bag 51 occurred during a predetermined time, then at step 132, a signal is sent to offsite server 70, and authorized removal of bag 51 from safe 52 is recorded at step 134. The information regarding the authorized removal of bag 51 from safe 52 is then written to an offsite server 70 at step 136.

At step 138, the clear view security bag 51 containing the cash deposit and RFID tag 56*a-c* is transported to a suitable financial institution 60. This may be accomplished by armored car service 32 or other secure transportation service suitable for transporting cash or other valuables to a financial institution 60 for further processing. As part of step 138, armored car service 32 may scan bags 51 with an RFID reader or antenna 54 on the armored car. The scan may occur only once when bags 51 enter the truck, as part of a pinging process within the armored car as described above for safe 52, when bags 51 leave the armored care, or otherwise. If a bag 51 leaves a safe 52 and is not detected on the armored car within a predetermined window of time, an exception report may be generated notifying the appropriate party (such as security service 32, loss prevention 74, or another party) of the respective lost bag 51.

At step 140, financial institution 60 reads RFID tag 56*a-c* associated with the deposit contained in the clear view security bag 51. By reading RFID tag 56*a-c*, financial institution 60 has access to information as to the amount and the particular denominations of cash that should be included in security bag 51. At the time of verification, the identification of the teller, time of the verification, and other information is recorded.

If cash carrier 32 transported bags 51, an RFID reader is used during the transfer to verify receipt of bags 51. Bags 51 may be temporarily placed in a safe/vault 52 at financial institution 60 and pinged as described above until the amount of cash in the respective security bag 51 is verified in step 142. Bags 51 may also be transported from retail facility 40 to financial institution 60 by the retail manager or other authorized personal. If this occurs after financial institution 60 closes, bags 51 may be placed in a night deposit box 146 shown in FIG. 3.

At step 142, the amount read from RFID tag 56*a-c* can be checked against the actual amount and denominations received by financial institution 60 that was contained in security bag 51. Step 142 may include a teller scanning the RFD tag 56*a-c* with an RFID reader at the teller station or window. At the time of scanning, the teller ID, time, and other related information about the verification is recorded by server 64 and/or server 70.

At step 144, a determination is made as to whether the amount read from RFID tag 56*a-c* and the amount received in security bag 51 match. If these amounts do not match, then the system alerts the security or loss prevention department 74 associated with the company that operates retail facility 40 at step 122. If the amounts do match, then the system sends a signal to offsite server 70 that the deposit was received by financial institution 60 as expected.

According to one embodiment of the present disclosure, the functions of offsite server 70 are split between at least two servers controlled by different entities. According to this embodiment, the POS information is received by a server under the control of the retailer and exception reports are received by a server under the control of a third party service provider, such as the supplier of safes 52 or electronic locks 53. Under this arrangement, the retail server provides the POS deposit information to locks 53 in step 104. The third party service provider tracks bags 51 and notifies the retailer's loss prevention department 74 of any exceptions. In this arrangement, strategic POS information, such as the items sold, quantities sold, and timing of sales, remains under the control of the retailer and the third party is only provided the POS information necessary to compare the deposit against actual sales.

Figure 3:
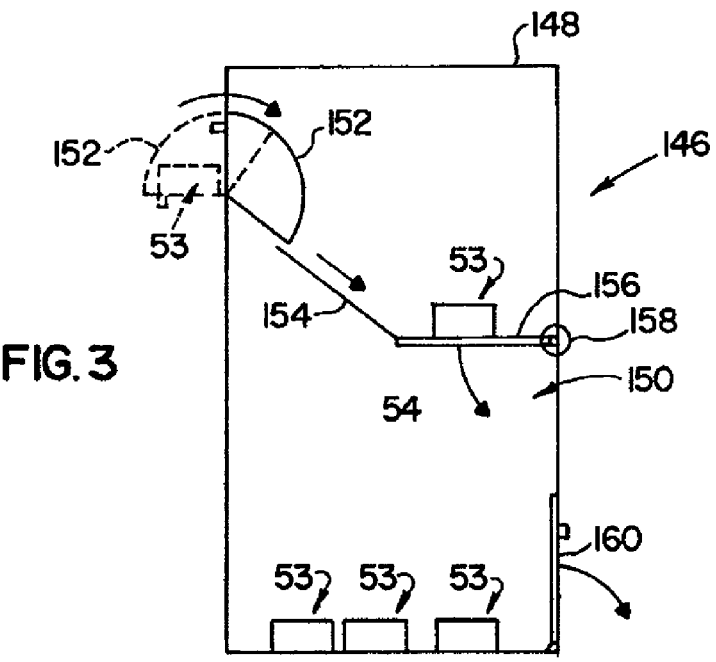
FIG. 3 is diagrammatic side elevation view of a night deposit box.

Additional detail of night deposit box 146 are shown in FIG. 3. Night deposit box 146 includes a housing 148 that defines a secure interior region 150 and an exterior door 152 that is hinged to housing 148. To deposit a bag 51 into box 146, a depositor opens exterior door 152, as shown in phantom in FIG. 3, and places bag 51 into door 152. The depositor closes door 152 and bag 51 slides down chute 154 onto shelf 156. Shelf 156 includes an RFID antenna 54. Night deposit box 146 includes a sensor (not shown), such as a door switch, weight sensor on shelf 156, or other sensor, that detects the deposit of bag 51. When a new bag 51 is detected, antenna 54 activates to read RFID tag 56a-c on bag 51 and records the information stored on RFID tag 56a-c. After bag 51 is recorded, a motor 158 rotates shelf 156 so bag 51 drops into interior region 150 and then returns shelf 156 to the position shown in FIG. 3. Later, a bank employee or other authorized personal opens interior door 160 to retrieve bags 51 that were deposited in night deposit box 146. Bags 51 may then be verified by a bank employee as described herein.

Figure 4:
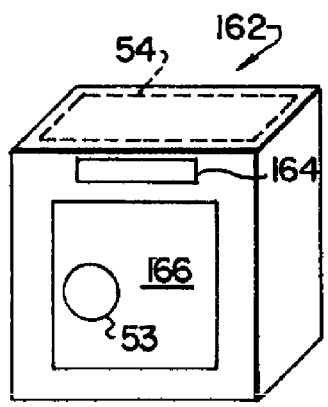
FIG. 4 is a diagrammatic perspective view of a safe.

Several alternative embodiment safes are shown in FIGS. 4-7 that are suitable for use with the system described herein. Safe 162 shown in FIG. 4 is similar to safe 52, but includes a slot 164 through which to deposit bags 51 without having to open safe door 166. Tag 50 in bag 51 is prepared as described above for safe 52. However, rather than unlocking lock 53 to permit bag 51 to be placed in safe 162, slot 164 opens to permit bag 51 to be dropped into safe 162. After a predetermined time, slot 164 closes. One or more antennas 54 are placed in safe 162 to ping RFID tags 56a-c placed in safe 162 as discussed above.

Figure 5:
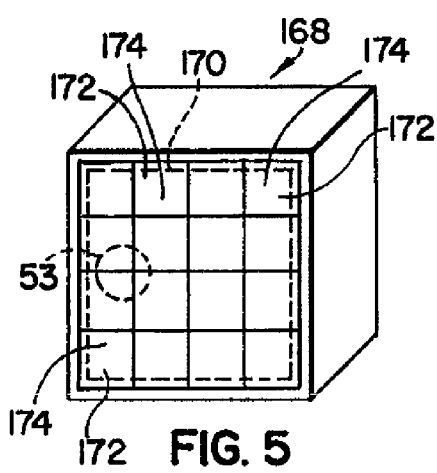
FIG. 5 is a diagrammatic perspective view of an alternative safe.

Safe 168 shown in FIG. 5 is compartmentalized. When safe door 170 (shown in phantom) is open, multiple compartments 172 are accessible within the interior of safe 168. To make a deposit, the steps for safe 52 are followed to record information on RFID tags 56a-c on bags 51 and permit safe door 170 to be opened. However, when each deposit is made, a compartment 172 is designated or assigned to each bag 51. The designation may be given in several ways including an indication from lock 53 (visual, audible, or otherwise). Each compartment 172 may include an individual lock (not shown) controlling each respective compartment door 174. If compartment locks are provided, indication of the designation of a particular compartment 172 may include unlocking the respective compartment door 174. After the compartment lock permits the respective compartment door 174 to open, the manager places the respective security bag 51 in the designated compartment 172. Next, the respective compartment door 174 and safe door 170 are closed. Each compartment 172 includes a safe antenna 54 that periodically pings each compartment 172 in a manner described herein to determine if the respective bags 51 are positioned in their designated compartment 172. Removal of a bag 51 is detected when the designated RFID tag 56a-c is no longer detected within the designated compartment 172.

Figure 6:
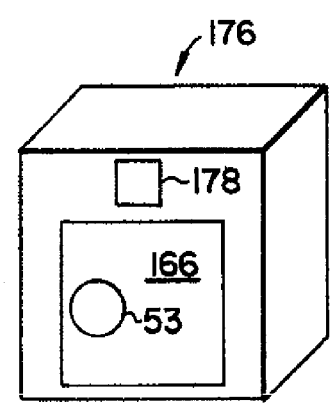
FIG. 6 is a diagrammatic perspective view of another alternative safe.
Figure 7:
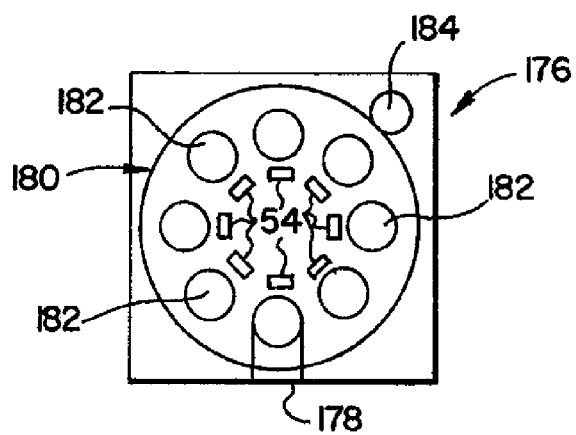
FIG. 7 is a top plan view of internal portion of the safe of FIG. 7.

Another safe 176 is shown in FIGS. 6 and 7. Safe 176 includes a slot 178, similar to slot 164 that opens to receive a security bag 51. Safe 176 includes a revolving, cylindrical carousel 180 including a plurality of compartments 182. Similar to safe 168, each bag 51 is assigned a compartment 182 to receive a designated bag 51. Before or at the time to receive a bag 51, a motor 184 rotates carousel 180 so the designated compartment 182 is aligned with slot 178 to receive the respective bag 51. After receiving the respective bag 51, slot 178 closes. According to one embodiment, each compartment 182 includes an antenna 54 that pings for its respective bag 51. According to another embodiment, motor 184 rotates each compartment 182 past one or more antennas 54 to ping the respective bags 51 while the compartment 182 holding the respective bag 51 is positioned near the antenna. To remove bags 51, door 166 is opened and each bag 51 is removed either through the top of compartment 182 or otherwise. Carousel 180 may rotate about a vertical or horizontal axis.

One implementation of the present disclosure is used in a branch, retail, or other banking environment. In such an environment, the system is used as described above in a bank rather than a retail facility 40. Rather than selling retail items to receive cash, bank tellers or other personal typically receive cash, checks, and other deposits and may provide bank customers with cash for their accounts, as a result of cashing a check, or otherwise. Tellers, managers, or other authorized person, place cash, checks, or other deposits in a security bag 51 as described above for retail facility 40. Each security bag 51 is placed in a safe/vault 52 within the bank and the deposit is verified as described above. Before being placed in safe/vault 52, the amount of cash, checks, etc. is verified against withdrawals and deposits at the teller station and written onto an RFID tag 56a-c. A cash carrier 32 or other service transports security bags 51 to a central bank in a manner similar to security bags 51 being taken from retail facility 40 to a bank or other financial institution.

In addition to security bags 51, RFID tags 50 may be used with other containers including ATM cassettes, cache cassettes offered by OMAL cash systems, canisters, and other containers. When used with ATM cassettes, RFID tags 56a-c may be provided with an ID of the cassette, ATM ID, the number and denomination of the cash held by the cassette before the cassette is placed in the ATM, the ID of the employee who loaded the cassette, total value of the cash loaded in the cassette, the number and denomination of the cash held by the cassette after the cassette is removed from the ATM, the AMT location and/or ID, the ID of the employee installing the cassette in the ATM, and other information related to the cassette or ATM. When the ATM cash carrier picks up the ATM cassette from the ATM, he may scan the RFID tag 56a-c for the information. With this information, a server at the central cash carrier station can determining how many and the denomination of bills that are headed to the station. At the central station, the amount of cash held in the cassette can be verified and redistributed into new ATM cassettes.

The system described herein may also be provided with additional features, such as counterfeit bill detection with recordation of counterfeit information to RFID tags 56a-c, digital cameras to record pictorial events relating to accessing safe 52, and GPS tracking of bags 51.

The system described herein can also be used with bill validation systems. During bill validation, cash is removed from the cash register by a manager or other authorized personnel and placed in the bill validation system. The bill validation system writes the results of the validation onto an RFID tag 56a-c on the bill validation cassette. The bill validation cassette is then deposited in safe 52 and/or picked up by cash carrier service 32 as described above.

In addition to tracking cash, the described system may also be used to track other items, such as other valuables, keys, tools, art, guns, gemstones, crime scene or other evidence, sensitive papers held in envelopes with RFID tags 56a-c, pharmaceutical bottles, and other items. For example, if a sensitive paper was removed from a secure filing cabinet without proper access rights, the system would ping for RFID tag 56a-c within the filing cabinet and send an exception report when the papers are missing or not returned on time. Pharmaceutical bottles with RFID tags 56a-c may be tracked and exception reports generated when bottles are removed by improper personnel or erroneously removed instead of a proper medication. In one application, the cash bills or other items themselves are provided with RFID tags and tracked in a manner similar to bags 51.

Another method for tracking the information described in this specification includes the use of a bar code on security bag 51. While still useful, attempting to use the bar code affixed to security bag 51 as additional security may be problematic because a deliberate act is required to read the bar code. If a manager or armored car transporter is responsible for the disappearance of the deposit, then a bar code system could be fooled if the steps necessary to capture a read of the deposit were taken and then the cash was simply not deposited in safe 52.

Unless otherwise stated herein, the figures are proportional. Although the present invention has been described in detail with reference to preferred embodiments, variations and modifications exist within the scope and spirit of the present invention.

What is claimed is:

1. A method of verifying a deposit comprising:
   providing a deposit bag with a radio frequency identification ("RFID") tag secured to the deposit bag;
   reading the RFID tag by a safe antenna to verify that the deposit bag has been deposited into a safe;
   attempting to communicate with the RFID tag by the safe antenna at a predetermined time; and
   sending a signal that the deposit bag has been removed from safe, if the RFID tag does not respond to the communication of the safe antenna.

2. The method of claim 1, further comprising the step of writing deposit information to the RFID tag.

3. The method of claim 2, wherein the deposit information includes the amount of cash held by the deposit bag.

4. The method of claim 2, wherein the deposit information includes the number and denomination of the cash held by the deposit bag.

5. A safe for securing assets, the safe comprising:
   a safe housing defining an interior region,
   a door permitting access to the interior region of the safe housing,
   a lock positioned to block access to the interior region though the door,
   a deposit container including an RFID tag, and
   at least one antenna in periodic communication with the RFID tag to detect the presence of the RFID tag within the interior region of the safe housing.

6. The safe of claim 5, wherein the RFID tag includes deposit information.

7. The safe of claim 5, further comprises an RFID transceiver positioned outside of the interior region of the safe housing, wherein the safe housing is RF opaque and the at least one antenna is positioned in the interior region of the safe housing.

8. The safe of claim 7, wherein the lock contains deposit information and the RFID transceiver communicates the deposit information from the lock to the RFID tag.

9. The safe of claim 8, wherein the lock includes a keypad and the deposit information is provided to the lock through the keypad.

10. The safe of claim 5, wherein the lock is coupled to a communication network and transmits a signal indicative of the communication of the at least one antenna with the RFID tag.

11. The safe of claim 10, wherein the signal indicates that the RFID tag is no longer present in the interior region of the safe housing.

12. The safe of claim 5, wherein the interior region of the safe housing is divided into a plurality of compartments sized to receive at least one deposit container, each compartment is positioned to receive an RFID signal from the at least one antenna to detect the presence of a deposit container in a compartment.

13. The safe of claim 12, wherein the safe housing includes an access opening and the compartments are positioned on a carousel that aligns the compartments to receive a deposit container from the access opening.

14. The safe of claim 12, wherein the safe includes a plurality of antennas in periodic communication with the RFID tag positioned to detect the presence of RFID tags within the compartments.

15. A cash tracking system comprising:
   a plurality of safes, each safe including an interior region sized to receive a plurality of deposit containers having an RFID tag secured thereto and at least one RF antenna coupled to the safe to detect the presence of the RFID tag within the safe,
   a server that receives information from the plurality of safes indicative of the location of the deposit containers based on the detection of the RFID antennas associated with the safes.

16. The cash tracking system of claim 15, wherein the at least one RF antennas are configured to periodical send a signal into the interior regions of the safes to activate a response from the RFID tags.

17. The cash tracking system of claim 15, wherein each of the plurality of safes include a transceiver configured to write deposit information to the RFID tags.

18. The cash tracking system of claim 17, wherein each of the plurality of safes include an RF opaque housing defining the interior region, the transceivers are positioned outside of the interior region of the housings, and the RF antennas are positioned within the interior regions of the housings.

19. The cash tracking system of claim 15, wherein the interior region of the each safe is divided into a plurality of compartments sized to receive at least one deposit container, each compartment is positioned to receive an RF signal from the at least one RF antenna to detect the presence of a deposit container in a compartment.

20. The cash tracking system of claim 15, wherein the server sends an exception report based on information received from at least one safe when a deposit container is not positioned within said safe.

* * * * *